Nov. 11, 1958 G. E. SANDEN ET AL 2,859,466
WINDSHIELD WIPER BLADE ASSEMBLY
Filed May 10, 1954 2 Sheets-Sheet 1
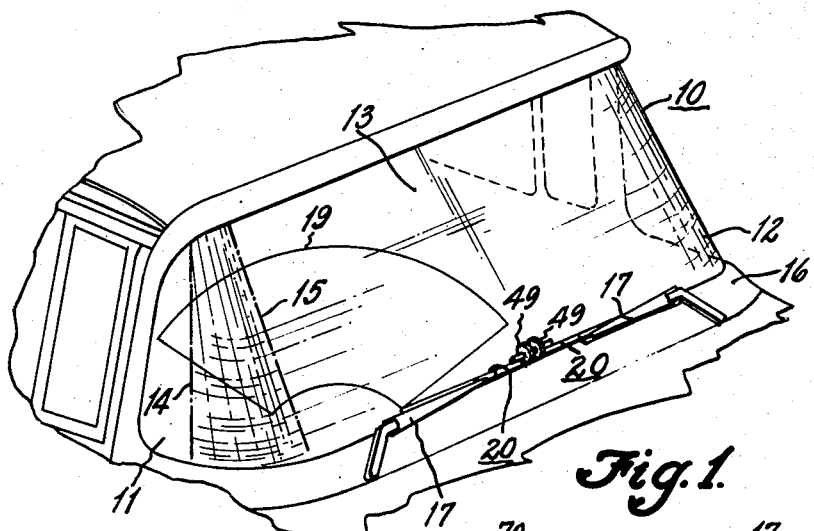
Fig. 1.
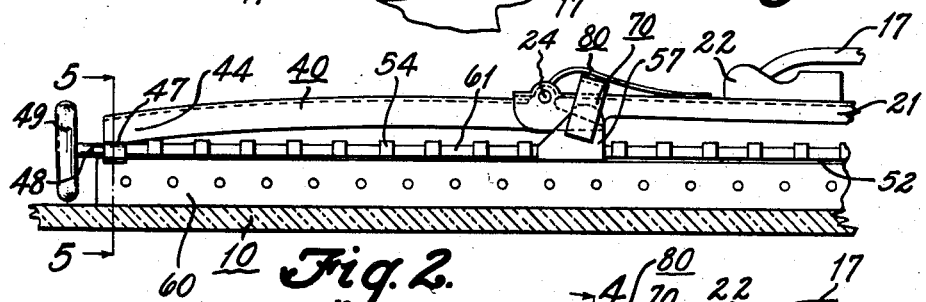
Fig. 2.
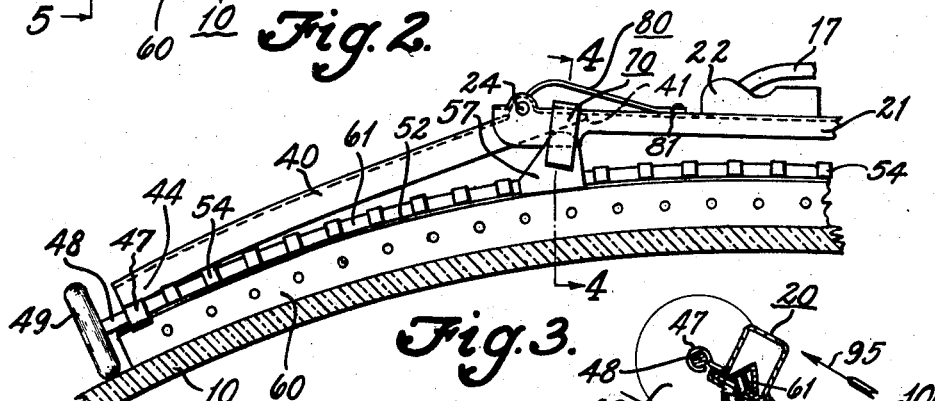
Fig. 3.
Fig. 6.
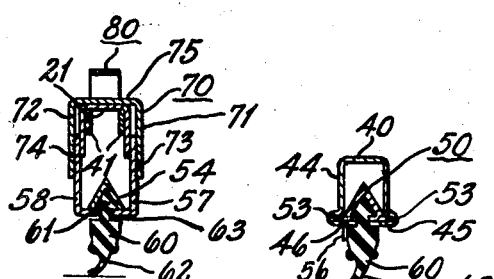
Fig. 4. Fig. 5.
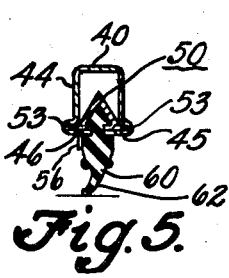
INVENTORS
GRANT E. SANDEN
BY CYRIL T. WALLIS
George H. Strickland
ATTORNEY Nov. 11, 1958  G. E. SANDEN ET AL  2,859,466
WINDSHIELD WIPER BLADE ASSEMBLY
Filed May 10, 1954  2 Sheets-Sheet 2

INVENTORS
GRANT E. SANDEN
BY CYRIL T. WALLIS

George H. Strickland
ATTORNEY

United States Patent Office 2,859,466
Patented Nov. 11, 1958

2,859,466
WINDSHIELD WIPER BLADE ASSEMBLY

Grant E. Sanden, Rochester, and Cyril T. Wallis, Brockport, N. Y., assignors to General Motors Corporation, Detroit, Mich., a corporation of Delaware Application May 10, 1954, Serial No. 428,561

19 Claims. (Cl. 15—245)

This invention pertains to window cleaners, and particularly to a wiper assembly adapted to clean a curved surface as well as a substantially planar surface.

Heretofore, windshield wiper blades have been designed for cleaning curved window surfaces, one type of blade being disclosed in the Anderson Patent No. 2,596,063. However, this type of blade was neither designed, nor does it properly clean, a sharply curved window surface, commonly known as a wrap around windshield. In this type of windshield, the end sections are disposed in spaced, substantially parallel, vertical planes on opposite sides of a vehicle, and the window extends throughout an arcuate distance of substantially 180°. With present day wiper blades, it is impossible to clean substantial portions of the sharply curved end sections due to the fact that the wiping element tilts excessively, or crowds the windshield surface to such an extent that present day wiper motors cannot effect uniform blade movement. This invention pertains to a blade assembly including means for preventing crowding of the wiping element, or squeegee, as well as means particularly adapted for cleaning a sharply curved surface. Accordingly, among our objects are the provision of a wiper blade assembly capable of effectively cleaning the front and side sections of a wrap around windshield; the further provision of a wiper assembly of the aforesaid character which is adapted for connection to any of the standard wiper arms now in use; the further provision of a wiper blade assembly including means for preventing crowding of the wiping element against the surface to be cleaned; and the still further provision of a wiper blade assembly which is spring biased to normally deform the wiping element so as to form a curved wiping edge including means for applying pressure to the backing strip thereof when the wiping element engages a substantially planar surface.

The aforementioned and other objects are accomplished in the present invention by providing a wiper blade assembly having pivotally mounted, spring biased side arm and means attached to the end of the side arm for preventing crowding of the wiping element against the surface to be cleaned by automatically limiting the angle of tilt thereof. Specifically, the wiper blade assembly includes a primary yoke, or holder, having an arm attaching part; a secondary yoke pivotally connected intermediate its ends to one end of the primary yoke, a side arm, or lever, pivotally connected adjacent one of its ends to the other end of the primary yoke; a tension spring, opposite ends of which are attached to the primary yoke and the side arm so as to normally draw the side arm inwardly; a flexible backing strip which carries the wiping element; a wiping element comprising a resilient member composed of elastomeric material, the ends of the secondary yoke being connected to the backing strip at longitudinally spaced points, and the free end of the side arm being slidably connected to the backing strip; and a bridge and cantilever spring arrangement, the end of which is arranged to engage the side arm so as to apply pressure to the backing strip when the wiper blade assembly traverses substantially planar surfaces. The end of the side arm, which is slidably connected with the backing strip has attached thereto a bracket which carries a stub shaft about which a roller is rotatably journaled.

The roller performs somewhat the same functions as the roller disclosed in copending application, Serial No. 428,563, now Patent 2,824,331, filed of even date herewith in the name of Cyril T. Wallis, in that it prevents crowding of the squeegee against the sharply curved surface of the windshield by limiting tilting thereof relative to the backing strip. However, in the present design, the roller may, or may not, engage the windshield during outward movement of the wiper blade, but does engage the windshield during inward movement of the wiper blade so as to prevent crowding of the squeegee as the wiper blade traverse the "hump," or section of the windshield having a pronounced curvature. In addition, a plurality of fingers have been attached to the outer end of the backing strip on one side thereof, which fingers assist the roller in preventing crowding of the squeegee.

Further objects and advantages of the present invention will be apparent from the following description, reference being had to the accompanying drawings wherein a preferred embodiment of the present invention is clearly shown.

In the drawings:

Fig. 1 is a fragmentary view, in perspective illustrating a vehicle with a wrap around windshield, and depicting the windshield area to be cleaned.

Fig. 2 is a fragmentary composite view illustrating operation of the wiper assembly of this invention, when cleaning a substantially planar surface.

Fig. 3 is a view similar to Fig. 2 illustrating the operation of the blade assembly of this invention when cleaning a curved surface.

Fig. 4 is a sectional view taken along line 4—4 of Fig. 3.

Fig. 5 is a sectional view taken along line 5—5 of Fig. 2.

Fig. 6 is a composite view illustrating the operation of a conventional wiper blade assembly on a sharply curved surface, and operation of the wiper blade assembly of this invention on the same sharply curved surface.

Figure 7:
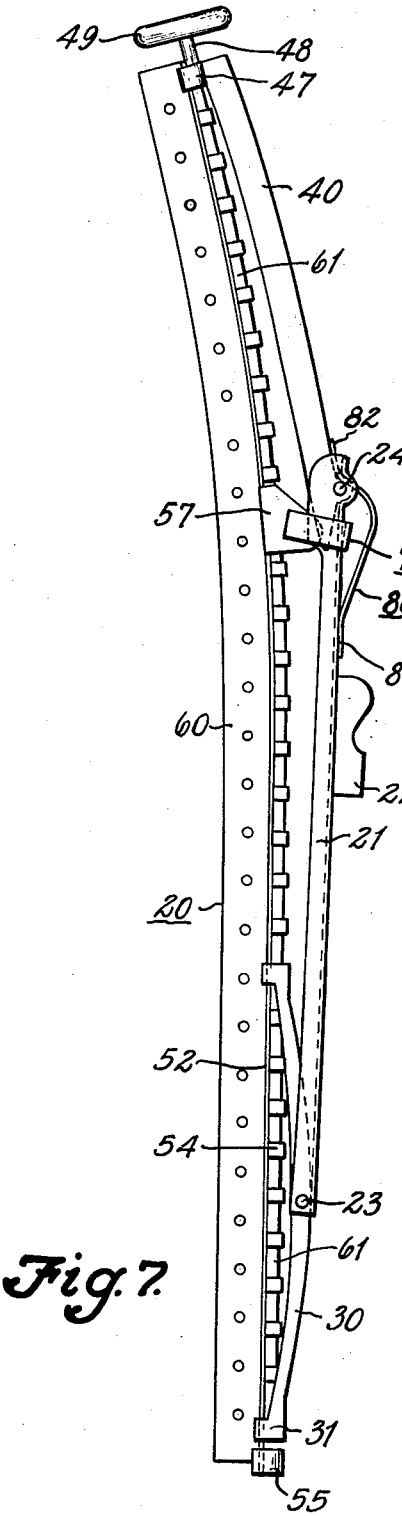
Fig. 7 is a side view, in elevation, of a blade assembly constructed according to this invention.

With particular reference to Fig. 1, a portion of a motor vehicle is depicted, the vehicle being of the type including a wrap around windshield generally indicated by the numeral 10. It will be observed that the windshield is of the type which is being used on some of the present day automobiles, and, thus, includes end sections 11 and 12 which are disposed in spaced, substantially parallel, vertical planes on opposite sides of the vehicle. The end sections 11 and 12 are formed integral with a curved front portion 13, from which it may be seen that the windshield extends throughout an arcuate distance of substantially 180°. In a windshield of this character, the portion between dotted lines 14 and 15 is commonly referred to as the "hump" in that it has a very pronounced curvature.

In a conventional manner, the vehicle includes a cowl or rail portion 16 through which spaced, oscillatable wiper shafts, not shown, project. Each wiper shaft has attached thereto a wiper arm assembly 17 of conventional construction, and, thus, it will be appreciated that the wiper arms 17 are capable of pivotal movement away from the surface of the windshield, and are spring biased against the surface of the windshield so as to apply wiping pressure to blade assemblies 20 which are operatively connected to the ends thereof.

Figure 8:
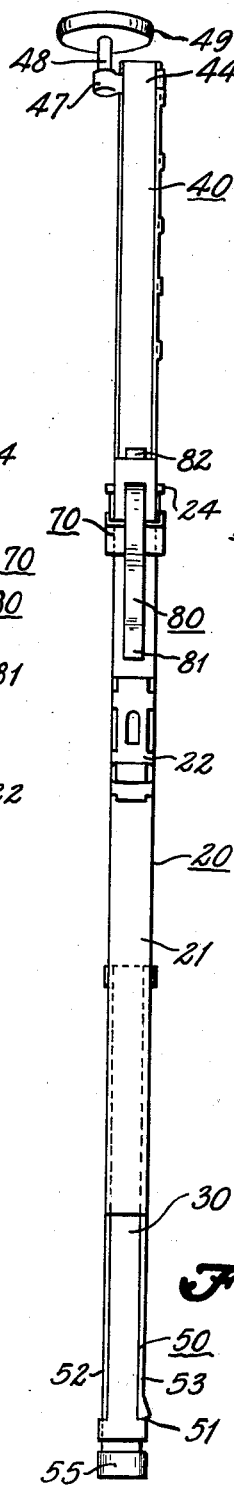
Fig. 8 is a plan view, in elevation, of the blade assembly of Fig. 7.
Figure 9:
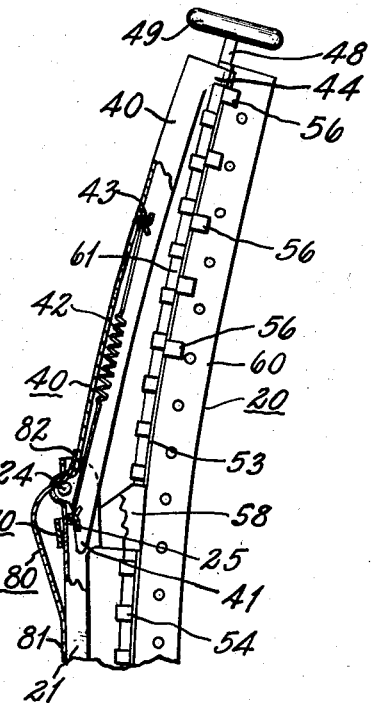
Fig. 9 is a fragmentary view, partly in section and partly in elevation, of the opposite side of the wiper blade assembly depicted in Fig. 7.

With particular reference to Figs. 7, 8 and 9, the wiper blade assembly of this invention will be described. The wiper blade assembly depicted generally by the numeral 20 includes a primary yoke, or holder, 21 having means 22 designed to detachably connect the wiper blade assembly to the free end of a wiper arm, the means 22 having a suitable locking device incorporated therein. One end of the primary yoke 21 is pivotally connected at 23 to the intermediate portion of a secondary yoke 30 of conventional construction. Thus, opposite ends of the secondary yoke 30 are operatively connected to longitudinally spaced points of a flexible backing strip, generally depicted by the numeral 50. In particular, the end 31 of the secondary yoke 30 is positioned in a notch 51 formed on the backing strip so as to limit longitudinal movement of the backing strip relative to the secondary yoke 30.

The backing strip 50 is constructed from an integral piece of metal and includes a pair of spaced longitudinally extending flanges 52 and 53, as well as a plurality of spaced eyelets, or hooks, 54. The wiper blade assembly 20 also includes a side arm 40, which is pivotally attached at 24 to the other end of the primary yoke or holder 20. As seen in Fig. 9, the side arm 40 includes tang portions 41 arranged to abut the inner peripheral surface of the holder 20 so as to limit pivotal movement of the side arm 40 in a counterclockwise direction, as viewed in Fig. 7, or a clockwise direction, as viewed in Fig. 8. A tension spring 42 has one end thereof operatively connected to a hook 43 on the side arm, and the other end thereof operatively connected to a hook 25 formed on the holder 20. It should be noted that the end of the spring 42, which is attached to the holder 20 is disposed below and longitudinally spaced from the center of the pivot 24. Accordingly, the spring 42 will move over a different arc than the side arm during pivotal movement thereof, so that the mechanical advantage of the spring 42 will become less as the side arm 40 approaches the horizontal position, as depicted in Fig. 2.

The backing strip 50 is arranged to support a resilient wiping element, or squeegee, 60, composed of elastomeric material. The backing strip 50 and the squeegee 60, when assembled, constitute a squeegee unit. The squeegee 60 may be of conventional construction, such as is used in present day wiper assemblies, and, thus, as shown in Figs. 4 and 5, includes a retention portion 61, generally triangular in cross section, a wiping portion 62, and a reduced neck portion 63, which is integral with the retention and wiping portions 61 and 62, and which pivotally interconnects the same. The wiping element 60 is readily flexible whereby it will conform to the curvature of the surface to be cleaned. Furthermore, the wiping element 60 is constructed so that it may be interconnected with the flexible backing strip 50 by inserting one end of the triangular portion 61 thereof into one of the hooks 54 so that the flanges 52 and 53 are received in the grooves between the portions 61 and 62 of the squeegee. Then, the squeegee 60 may be slid longitudinally relative to the backing strip 50. Thereafter, an abutment member 55 composed of hard, rubber-like material is interlocked with the inner end of the flexible backing strip 50 so as to prevent separation of the backing strip and the squeegee, as will be pointed out more particularly hereinafter.

Referring again to Figs. 7 through 9, it may be seen that the free end of the side arm 40 is slidably interconnected with the outer end 44 of the flexible backing strip. With reference to Fig. 5, it may be seen that the free end 44 of the side arm 40 is formed with a pair of inwardly extending flanges 45 and 46, which embrace flanges 52 and 53 of the backing strip and are situated in the groove between portions 61 and 62 of the squeegee. Thus, during pivotal movement of the side arm 40, as shown in Figs. 2 and 3, relative longitudinal movement occurs between the flexible backing strip and the end 44 of the side arm. Furthermore, as shown in Figs. 7 through 9, the free end 44 of the side arm 40 has attached thereto a bracket 47, which carries a stub shaft 48, about which a roller 49 is rotatably supported. The purpose of the roller will be more particularly described hereinafter.

In addition, it may be seen that the side of the flexible backing strip opposite that of the bracket 47 and shaft 48 is formed with a plurality of inwardly extending fingers 56, the purpose of which will, likewise, be pointed out more particularly hereinafter. Furthermore, the backing strip 50 is formed with a pair of upwardly extending, integral flanges 57 and 58, which form a channel that is embraced by a channel shaped bridge member 70 having side flange portions 71 and 72, which are welded to flanges 57 and 58, respectively, at 73 and 74, as shown in Fig. 4. The portion 75 of the bridge member 70, which interconnects the side flanges 71 and 72, extends over the top of the primary yoke, or holder, 21. However, the yoke 21 is freely movable relative to the bridge 70. In addition, the primary yoke has anchored thereto one end 81 of a cantilever spring 80, the free end 82 of which engages the side arm 40 outwardly of the pivot point 24, as shown in Figs. 7 through 9. The function of the cantilever spring and bridge arrangement is shown in Fig. 2, that function being to apply pressure to the backing strip 50 via the side arm 40 when the squeegee 60 traverses substantially planar surfaces.

Exhaustive studies have indicated that the only portion of a wrap around windshield which can be properly cleaned with present day wiper blade assemblies of the type disclosed in the aforementioned patent, is that portion between the cowl 16 of the windshield, as viewed in Fig. 1, and dotted line 15, i. e. about 90°. However, with the wiper blade assembly of this invention, substantial portions of the sharply curved side sections can be effectively cleaned, and the wiper blades may traverse an arc from the cowl 16 of substantially 150°. The side arm construction of the instant blade adjacent the outer end thereof, which traverses the most sharply curved portions of the windshield, is designed to follow the changing curvature of the surface and effect adequate cleaning thereof. The tension spring arrangement 42, as employed in the instant blade design, can be adjusted so that the force required to deflect the side arm from its normal position, as shown in Figs. 7 and 9, will increase, decrease, or remain substantially constant. Preferably, the force required is substantially constant, and the normal position of the blade results in a curved configuration of the squeegee, as shown in Figs. 7 and 9. Furthermore, due to the arrangement of the side arm spring, deflection of the blade from a curved configuration to a substantially flat configuration requires only a slight force, and for this reason, the squeegee will follow the curvature of the surface without excessive pressure being exerted on the squeegee at any point.

As pointed out in the aforementioned copending application, studies have shown that one of the principal reasons why present day wiper blade assemblies cannot be used to properly clean the sharply curved portion, or hump, of a wrap around windshield, resides in the fact that the wiping portion 62 of the squeegee 60 tilts excessively. When the squeegee tilts excessively, it crowds the windshield and imposes an overload on the wiper motor, such that uniform blade movement, and, hence, proper cleaning of the windshield cannot be effected. With particular reference to Fig. 6, the line 90 depicts the actual curvature of a windshield at the outer end of the blade, as indicated by line 19 in Fig. 1. The arrow 95 indicates the direction of wiper blade movement. The phantom wiper blade assembly 100 is of the type presently being used, while the wiper assembly 20 is constructed according to the present invention. From an inspection of the phantom blade 100, it will be noted that the squeegee has tilted excessively, thereby resulting in the imposition of an overload on the wiper motor and improper cleaning of the windshield surface. In the present invention, the roller 49, in combination with the fingers 56, limits the angle of tilt of the wiping portion 62 to substantially 10° relative to the curved surface. Thus, an arcuate distance of substantially 150° from the rail can be properly cleaned.

The roller 49 may or may not engage the windshield during counterclockwise movement of the left-hand blade 20, as viewed in Fig. 1, since during this movement there is very little tendency of the wiping element to crowd the windshield. However, on the return stroke in the clockwise direction of the left-hand blade, as viewed in Fig. 1, the roller will engage the windshield as the blade traverses the sharply curved portions thereof, thereby preventing excessive tilting of the squeegee. In actual construction, the axis of the roller 49 may be spaced approximately 3/16" from the wiping edge of the squeegee in a direction so that the roller 49 leads the blade movement in the clockwise direction, as depicted in the left-hand blade of Fig. 1, while lagging in the counterclockwise direction.

While the embodiment of the present invention as herein disclosed, constitutes a preferred form, it is to be understood that other forms might be adopted.

What is claimed is as follows:

1. A windshield cleaner comprising, a holder having an arm attaching part, a yoke movably connected to one end of said holder, a member movably connected to the other end of said holder, resilient means interconnecting spaced points on the member and the holder for normally maintaining a predetermined angular relationship therebetween, and a squeegee unit freely flexible throughout its length and connected at longitudinally spaced points to said yoke and said member.

2. A wiper for cleaning a curved surface comprising, a resilient wiping element conformable to the surface to be wiped, a holder having an arm attaching part, a yoke connected intermediate its ends to one end of said holder and having its opposite ends operatively connected with said wiping element, a member having one end pivotally connected to the other end of said holder, and resilient means biasing said member so as to normally deform said resilient wiping element, the other end of said member being operatively connected to said wiping element.

3. A wiper for cleaning a curved surface comprising, a resilient wiping element readily conformable to the surface to be wiped, a flexible backing strip for supporting said wiping element, a holder, a yoke movably connected to one end of said holder intermediate its ends, the ends of said yoke being movably connected to said backing strip, a member having one end pivotally connected with the other end of said holder, the other end of said member being slidably connected with said backing strip, and resilient means interconnecting spaced points on said member and holder for normally deforming said flexible backing strip and wiping element.

4. A wiper for cleaning a curved surface comprising, a resilient wiping element readily conformable to the surface to be wiped, a flexible backing strip for supporting said wiping element, a holder, a yoke movably connected to one end of said holder intermediate its ends, the ends of said yoke being movably connected to said backing strip, a member having one end pivotally connected with the other end of said holder, the other end of said member being slidably connected with said backing strip, and a coil spring, one end of said spring being connected with said holder at a point spaced from the pivotal connection between said member and said holder, the other end of said spring being connected to a point on said member whereby the flexible backing strip and wiping element are normally deformed.

5. A wiper for cleaning a curved surface comprising, a resilient wiping element readily conformable to the surface to be wiped, a flexible backing strip for supporting said wiping element, a holder, a yoke movably connected to one end of said holder intermediate its ends, the ends of said yoke being movably connected to said backing strip, a member having one end pivotally connected with the other end of said holder, the other end of said member being slidably connected with said backing strip, and a coil spring, one end of said spring being anchored to said holder at a point spaced from and below the center of the pivotal connection between said holder and said member, the other end of said spring being anchored to a point on said member whereby the force required to deflect said arm from its normal position remains substantially constant.

6. A wiper for cleaning a curved surface comprising, a resilient wiping element readily conformable to the surface to be wiped, a flexible backing strip for supporting said wiping element, a holder, a yoke movably connected to one end of said holder intermediate its ends, the ends of said yoke being movably connected to said backing strip, a member having one end pivotally connected with the other end of said holder, the other end of said member being slidably connected with said backing strip, resilient means interconnecting spaced points on said holder and member for normally deforming said backing strip and wiping element, and cooperable means on said member and holder for limiting deformation of said backing strip and wiping element by said resilient means.

7. A wiper for cleaning a curved surface comprising, a resilient wiping element readily conformable to the surface to be wiped, a flexible backing strip for supporting said wiping element, a holder, a yoke movably connected to one end of said holder intermediate its ends, the ends of said yoke being movably connected to said backing strip, a member having one end pivotally connected with the other end of said holder, the other end of said member being slidably connected with said backing strip, first resilient means interconnecting spaced points on said holder and member for normally deforming said backing strip and said wiping element, and second resilient means engageable with said member for applying pressure to said member and said backing strip when the wiping element traverses a substantially planar surface.

8. A wiper for cleaning a curved surface comprising, a resilient wiping element readily conformable to the surface to be wiped, a flexible backing strip for supporting said wiping element, a holder, a yoke movably connected to one end of said holder intermediate its ends, the ends of said yoke being movably connected to said backing strip, a member having one end pivotally connected with the other end of said holder, the other end of said member being slidably connected with said backing strip, a spring, one end of said spring being anchored to said holder at a point spaced from the pivotal connection between said member and said holder, the other end of said spring being anchored to a point on said member whereby said member is normally positioned so as to deform said backing strip and wiping element, and resilient means engageable with said member for applying pressure to said member and said backing strip when the wiping element traverses a substantially planar surface.

9. A wiper for cleaning a curved surface comprising, a resilient wiping element readily conformable to the surface to be wiped, a flexible backing strip for supporting said wiping element, a holder, a yoke movably connected to one end of said holder intermediate its ends, the ends of said yoke being movably connected to said backing strip, a member having one end povitally connected with the other end of said holder, the other end of said member being slidably connected with said backing strip, resilient means interconnecting spaced points on said member and said holder for normally positioning said member so as to deform said flexible backing strip and said wiping element, and a cantilever spring, one end of which is anchored to said holder, and the other end of which engages said member for applying pressure to said member and said backing strip when said wiping element traverses a substantially planar surface.

10. A wiper assembly for cleaning a curved surface including, a resilient wiping squeegee readily conformable to the surface to be wiped, a flexible backing strip for supporting said squeegee, a holder for distributing wiping pressure to said backing strip, an element movably connected to one end of said holder, opposite ends of said element being movably connected to spaced points on said backing strip, a member having one end pivotally connected to the other end of said holder, the other end of said member being movably connected with said backing strip, resilient means interconnecting spaced points on said member and said holder for normally deforming said backing strip and said squeegee, and cooperable means on said member and holder for limiting deformation of said backing strip and said squeegee by said resilient means.

11. A wiper assembly for cleaning a curved surface including, a resilient wiping squeegee readily conformable to the surface to be wiped, a flexible backing strip for supporting said squeegee, a holder for distributing wiping pressure to said backing strip, an element movably connected to one end of said holder, opposite ends of said element being movably connected to spaced points on said backing strip, a member having one end pivotally connected to the other end of said holder, the other end of said member being movably connected with said backing strip, and a spring, one end of said spring being connected to said holder at a point spaced from the pivotal connection between said member and holder, the other end of said spring being connected to a point on said member whereby said member is normally positioned so as to deform said flexible backing strip and said squeegee.

12. A wiper assembly for cleaning a curved surface including, a resilient wiping squeegee readily conformable to the surface to be wiped, a flexible backing strip for supporting said squeegee, a holder for distributing wiping pressure to said backing strip, an element movably connected to one end of said holder, opposite ends of said element being movably connected to spaced points on said backing strip, a member having one end pivotally connected to the other end of said holder, the other end of said member being movably connected with said backing strip, and a spring, one end of which is anchored to said holder at a point spaced from and below the pivotal connection between said holder and said member, the other end of said spring being anchored to said holder whereby the force required to deflect said arm from its normal position remains substantially constant.

13. A wiper assembly for cleaning a curved surface including, a resilient wiping squeegee readily conformable to the surface to be wiped, a flexible backing strip for supporting said squeegee, a holder for distributing wiping pressure to said backing strip, an element movably connected to one end of said holder, opposite ends of said element being movably connected to spaced points on said backing strip, a member having one end pivotally connected to the other end of said holder, the other end of said member being movably connected with said backing strip, first resilient means interconnecting spaced points on said holder and said member for normally deforming said flexible backing strip and said squeegee, and second resilient means engageable with said member for applying pressure to said member and said backing strip when said squeegee traverses a substantially planar surface.

14. A wiper assembly for cleaning a curved surface including, a resilient wiping squeegee readily conformable to the surface to be wiped, a flexible backing strip for supporting said squeegee, a holder for distributing wiping pressure to said backing strip, an element movably connected to one end of said holder, opposite ends of said element being movably connected to spaced points on said backing strip, a member having one end pivotally connected to the other end of said holder, the other end of said member being movably connected with said backing strip, resilient means interconnecting spaced points on said member and said holder, and means carried by said member and engageable with the surface to be wiped for limiting tilting of said squeegee relative to said backing strip.

15. A wiper assembly for cleaning a curved surface including, a resilient wiping squeegee readily conformable to the surface to be wiped, a flexible backing strip for supporting said squeegee, a holder for distributing wiping pressure to said backing strip, an element movably connected to one end of said holder, opposite ends of said element being movably connected to spaced points on said backing strip, a member having one end pivotally connected to the other end of said holder, the other end of said member being movably connected with said backing strip, resilient means interconnecting spaced points on said holder and member for normally deforming said backing strip and said squeegee, and roller means carried by said member and engageable with the surface to be wiped for preventing crowding of said squeegee against said curved surface.

16. A wiper assembly for cleaning a curved surface including, a resilient wiping squeegee readily conformable to the surface to be wiped, a flexible backing strip for supporting said squeegee, a holder for distributing wiping pressure to said backing strip, an element movably connected to one end of said holder, opposite ends of said element being movably connected to spaced points on said backing strip, a member having one end pivotally connected to the other end of said holder, the other end of said member being movably connected with said backing strip, resilient means interconnecting spaced points on said holder and said member for normally deforming said backing strip and said squeegee, and means carried by said backing strip and engageable with said squeegee for limiting tilting movement thereof relative to said backing strip.

17. The combination set forth in claim 18 wherein said last recited means comprise a plurality of fingers attached at longitudinally spaced points to said backing strip, said fingers being engageable with said squeegee for limiting tilting movement thereof relative to said backing strip.

18. A windshield wiper blade comprising, an elongate flexible body having a wiping edge, a flexible backing therefor, an arm-pressure distributing member extending lengthwise of the body, a second member extending lengthwise of the body beneath one end of the first member and pivotally connected thereto for distributing arm pressure as transmitted to it by said one end, opposite ends of the second member being connected to the backing at longitudinally spaced points, a third member extending lengthwise of the body and pivotally connected at one end to the opposite end of said first member, the other end of said third member being movably connected to said backing adjacent the outer end thereof, and resilient means interconnecting the first and third members for applying additional pressure to the outer portion of said backing and said flexible body so as to normally deform the same in a curvilinear shape.

19. A windshield wiper blade comprising, an elongate flexible body having a wiping edge, a flexible backing therefor, an arm-pressure distributing member extending lengthwise of the body, one end of said member being indirectly connected to said backing through a second pressure distributing member which is pivotally connected intermediate its ends to said one end of the first member and, in turn, has its opposite ends connected to the backing at longitudinally spaced points, and a third pressure distributing member pivotally connected to the first member at its other end and movably connected to the backing adjacent an end thereof, and resilient means interconnecting said first and third members for applying additional pressure to a portion of the backing and the flexible body to normally deform the same.

References Cited in the file of this patent

UNITED STATES PATENTS

| | | |
|---|---|---|
| 1,694,245 | Baker | Dec. 4, 1928 |
| 2,664,583 | Oishei | Jan. 5, 1954 |
| 2,672,641 | Scinta | Mar. 23, 1954 |

FOREIGN PATENTS

| | | |
|---|---|---|
| 667,253 | Great Britain | Feb. 27, 1952 |
| 820,156 | France | July 26, 1937 |
| 1,033,521 | France | Apr. 1, 1953 |